O. A. J. R. LIPPERT-BRUENAUER.
SHAFT HANGER.
APPLICATION FILED OCT. 1, 1919.
1,361,474.
Patented Dec. 7, 1920.
2 SHEETS—SHEET 2.
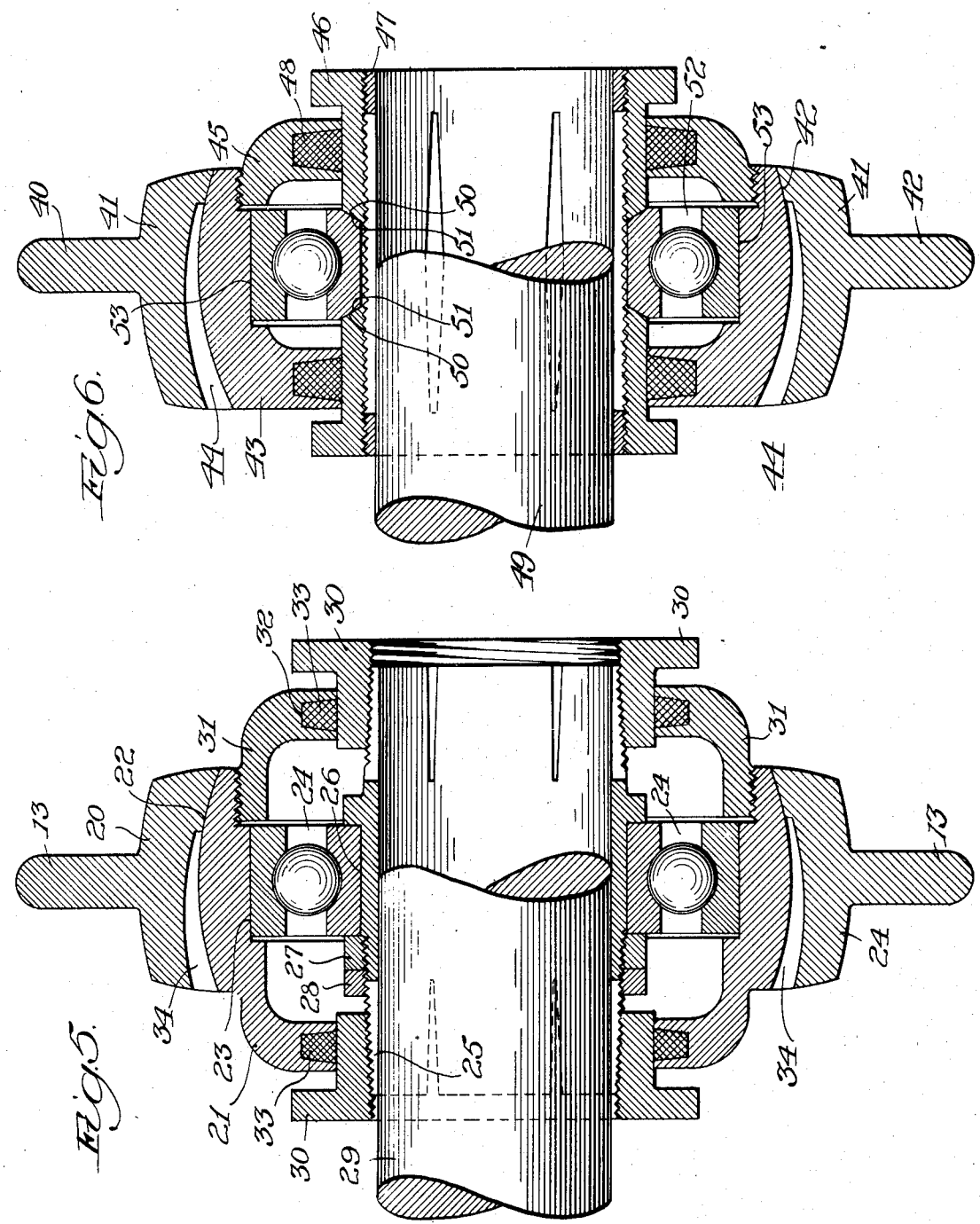

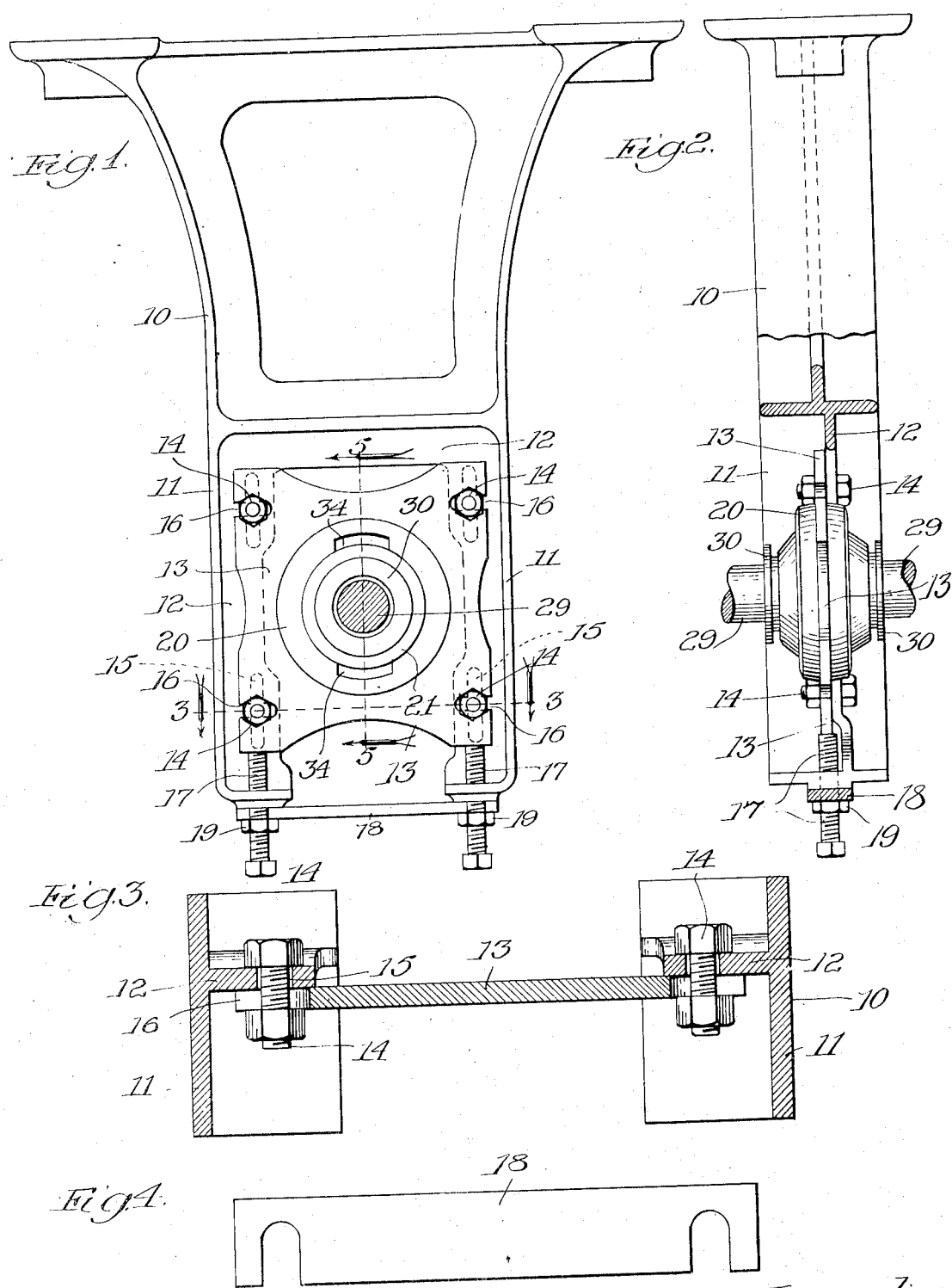

UNITED STATES PATENT OFFICE.

OTTO A. J. R. LIPPERT-BRUENAUER, OF CHICAGO, ILLINOIS.

SHAFT-HANGER.

1,361,474.     Specification of Letters Patent.     Patented Dec. 7, 1920.

Application filed October 1, 1919. Serial No. 327,738.

*To all whom it may concern:*

Be it known that I, OTTO A. J. R. LIPPERT-BRUENAUER, a citizen of the United States, residing at Chicago, in the county of Cook and State of Illinois, have invented a new and useful Improvement in Shaft-Hangers, of which the following is a specification.

The present invention relates to shaft-hangers or supports, and more particularly to shaft hangers wherein antifriction bearings are provided for the support of the shaft.

In order that the invention may be clearly understood, an embodiment thereof is illustrated in the accompanying drawings, wherein—

Figure 1 is a front elevation of a shaft hanger constructed in accordance with the invention;

Fig. 2 is a side elevation, partially broken away, of the shaft hanger;

Fig. 3 is a transverse sectional view on the line 3—3 of Fig. 1;

Fig. 4 is a detail view of the keeper used as a retaining member at the lower end of the shaft hanger yoke;

Fig. 5 is a sectional view through the shaft bearing and its supporting pad on line 5—5 of Fig. 1;

Fig. 6 is a sectional view illustrating a modified form of bearing arrangement within the shaft support.

Referring more particularly to the drawing, 10 indicates the frame of a shaft hanger of the depending type, the lower portion 11 thereof being formed as a downwardly opening yoke, the top and side members of which are formed or otherwise provided with inwardly projecting supporting flanges 12. A pad or web member 13, of substantially rectangular shape, is adjustably retained within the yoke 11, for example, by means of bolts 14 passing through slots 15 and 16 in the supporting flange 12 and the pad 13 respectively, the slots 15 and 16 being at right angles to each other. As illustrated, the slots 15 in the flange may be vertical and those, 16, in the web horizontal. Vertically adjustable bolts 17 in the lower portion of the yoke 11 engage the lower portion of the pad 13 and aid in its adjustment and support. A keeper 18, extending transversely across the bottom of the yoke to close the same, is retained in its proper position upon bolts 17 by means of lock nuts 19.

In order to receive the casing which retains the antifriction bearings for the shaft, the pad 13 is provided with a central opening surrounded by an annular enlarged portion 20 having an internal bearing surface preferably of spherical contour. The casing 21 for the antifriction bearing, which is illustrated as a ball bearing (see Fig. 5) is provided with an external spherical bearing surface 22 adapted to engage and fit within the bearing surface 20 and preferably of substantially the same width as the latter. Within the casing 21 an annular groove 23 serves as a seat for the outer race of a ball bearing 24, the inner race of which is secured upon a cylindrical seat formed on pipe-threaded adapter sleeve 25. An annular flange or shoulder 26, likewise formed on the sleeve 25 serves to prevent displacement of the bearing in one direction, displacement in the other direction being prevented by nut 27 and lock nut 28. The adapter sleeve 25, which is slotted at its ends, is secured in position on the shaft 29 by means of the internally threaded flanged collars 30, 30, one of which fits into an opening formed in casing 21 and the other into a substantially identical opening in a cover member 31 which is secured to the casing 21 by the engagement of coöperating threads. Annular grooves 32 formed in the openings in the casing 21 and cover member 31 receive the sealing rings 33. As is readily apparent, when assembled a closed construction is produced, adapted for the reception of lubricant.

The spherical conformation of the mutually engaging bearing surfaces permits of a relative rotation of the casing 21 within the supporting pad, such as may be caused by distortion or poor alinement of the shaft 29, and likewise prevents their disengagement, since they are so formed that, of the circles of the sphere formed by planes perpendicular to the central axis or shaft, that of the greatest diameter has an approximately central position. To permit removal of the casing 21 from the pad the enlarged bearing portion 20 of the latter is formed with diametrically opposite slots or grooves 34 substantially parallel to the shaft extending partially therethrough, which grooves are of the same width as the bearing surface 22 of the casing and which are of sufficient depth to permit of the removal of the casing when the latter is rotated to a position at right angles to its normal position within the pad.

In the modified form of construction illustrated in Fig. 6, the supporting pad 40 is provided centrally with an annular enlarged bearing portion 41 having an internal spherical bearing surface 42 within which is fitted the spherical bearing surface of the casing 43, opposite grooves 44 being provided to permit the removal of casing 42 when at right angles to its normal position. The casing 43 is closed by means of a screwed-in cover member 45, the casing and cover members being provided with openings through which pass the flanged collars 46, 46, which are internally threaded to engage the threads on the external surface of adapter sleeve 47. The casing and cover members are likewise provided with inset sealing rings 48 surrounding the collars 46. The adapter sleeve 47 is tapered slightly from its central portion to its ends and is slotted longitudinally between its ends, whereby the application of the collars 46, 46, causes it to clamp the shaft 49 to which it is applied. The collars 46, 46 are provided at their internal ends with beveled edges 50, which engage the correspondingly tapered surfaces 51 on opposite sides of the inner race of bearing 52. The outer race of the bearing seats in a groove 53 provided in the casing 43.

Although I have described certain specific forms of construction as embodying my invention, I do not intend that the details of construction thus described shall be regarded as limitations upon the scope of the invention except in so far as included within the accompanying claims.

I claim:

1. In shaft supporting means, in combination, a shaft, a bearing therefor, a retaining member for the bearing, a pad provided with means for supporting the retaining member, a supported frame member, the pad and frame member being provided with intersecting slots, and bolts passing through said slots to retain the pad and frame member in relatively fixed position.

2. In combination with a shaft, a slotted, threaded sleeve mounted thereupon, collars screwed on said sleeve and clamping it to the shaft, said collars having their internal ends beveled, a casing having openings fitted to and surrounding said collars, bearings interposed between the casing wall and the adapter sleeve, said bearings having tapered edges engaging the beveled ends of the collars, and means for supporting the casing.

3. In shaft-supporting means, in combination, a shaft, a bearing therefor, a retaining member for the bearing, a pad provided with means for supporting the retaining member, a supported frame member in the form of a downwardly-opening yoke, the pad and frame member being provided with intersecting slots, bolts passing through said slots to retain the pad and frame member in relatively fixed position, a keeper-bar extending across the lower ends of the arms of said yoke-member, and adjusting screws engaging said keeper, said yoke and said pad.

OTTO A. J. R. LIPPERT-BRUENAUER.